NAVIGATION APPARATUS
Filed June 22, 1938
2 Sheets-Sheet 1
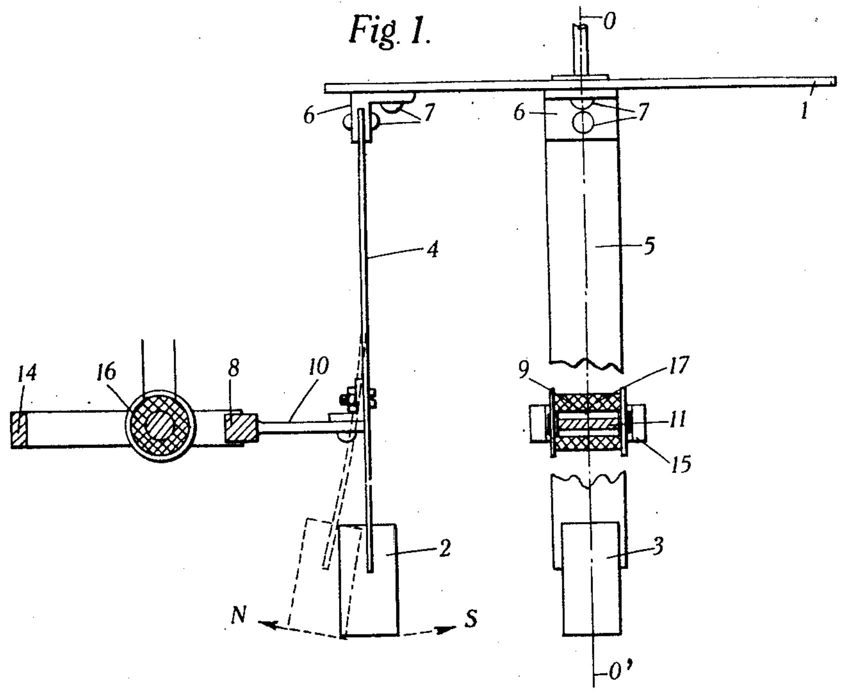
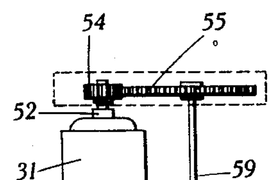
Fig. 3.
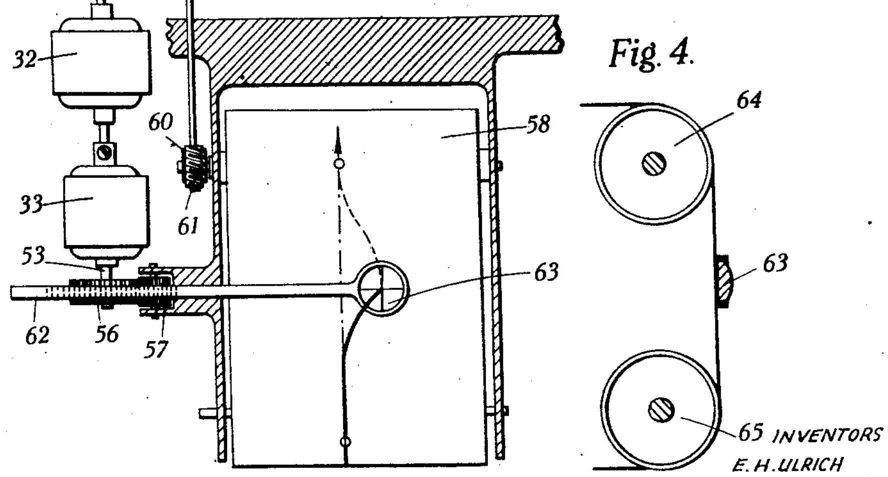
INVENTORS
E. H. ULRICH
H. G. BUSIGNIES
BY
ATTORNEY NAVIGATION APPARATUS
Filed June 22, 1938 2 Sheets-Sheet 2
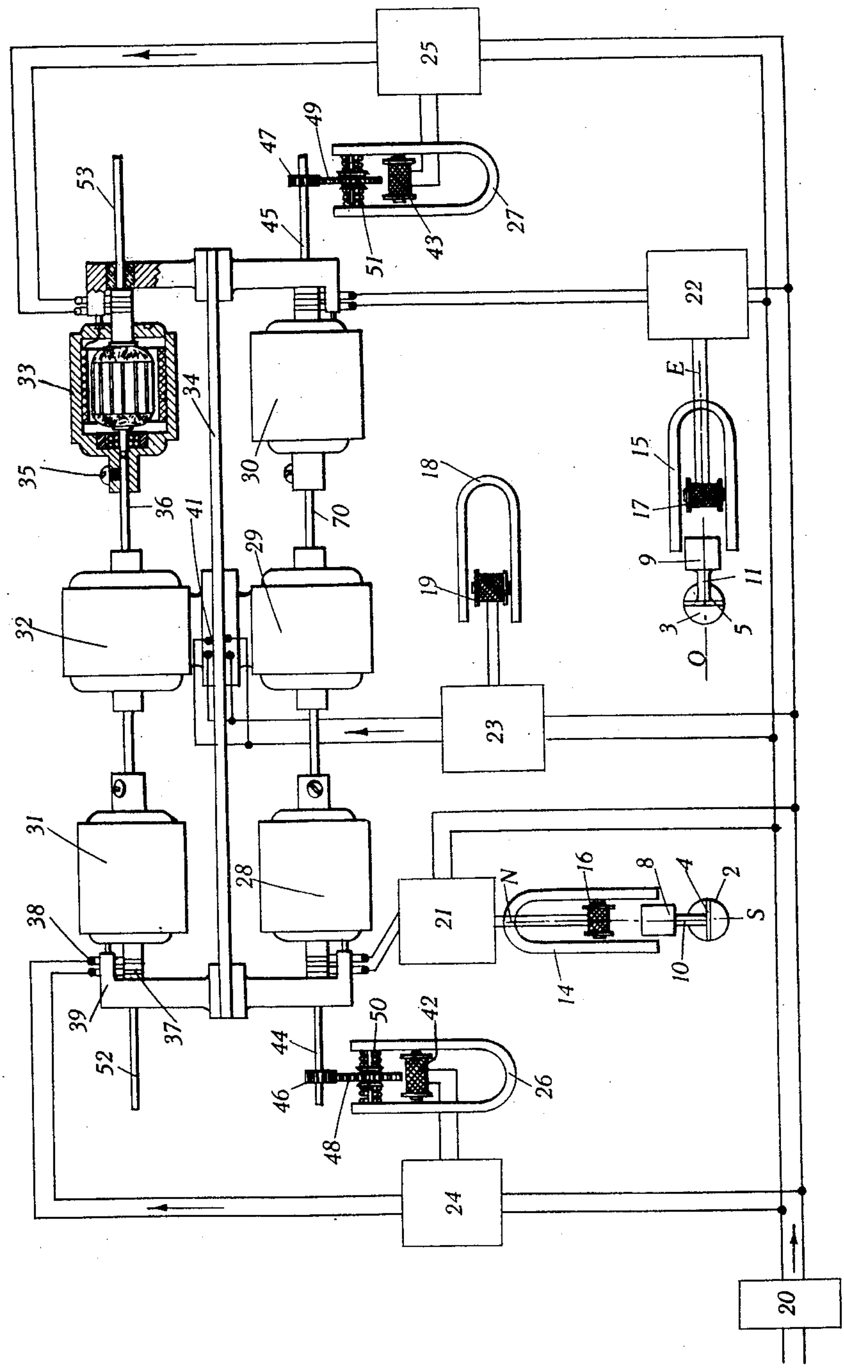
INVENTORS
E. H. ULLRICH
H. G. BUSIGNIES
BY
E. D. Phinney
ATTORNEY

UNITED STATES PATENT OFFICE 2,266,449

NAVIGATION APPARATUS

Edward Hill Ullrich and Henri Gaston Busignies, Paris, France, assignors to International Standard Electric Corporation, New York, N. Y.

Application June 22, 1938, Serial No. 215,304
In France June 25, 1937

5 Claims. (Cl. 73—152)

The present invention relates to navigation instruments, such as route or altitude indicators, permitting more particularly the route, whatever it may be, followed from the point of departure to be ascertained, without other knowledge than that of said point of departure.

The invention provides in particular, in accordance with certain of its features, means of obtaining such indications.

Although the invention is illustrated, in the drawings attached to the present description, by reference to a single embodiment, it must be understood that it is capable of numerous modifications and adaptations to attain a desired end, some of which will be mentioned hereunder, but that it is not by any means restricted by the examples given.

Broadly, according to the invention there is provided on board a moving vehicle, a mass M1 disposed to be displaced only along an axis coincident for example, with the axis of displacement of the vehicle. Through the medium of a device A, said mass M1 may serve to measure the accelerations of the vehicle which give rise to the displacements of said mass.

A second apparatus B—electrical, mechanical, chemical or consisting of a suitable combination of these three means—may be provided to integrate in terms of time the acceleration values indicated on the instrument A. The speed of the vehicle will thus be obtained.

A third apparatus C, identical with or different from B, may be suitably provided to integrate the results supplied by B; the integration of said results, which represent the speeds of the vehicle at each moment, will give the distance covered by the vehicle.

These accelerations, speeds and distances obtained are obviously only for the actual direction of the axis in accordance with which the mass M1 under consideration may be displaced.

The plane of displacement of the mass M being associated with a fixed axis in space, a second mass M2 is provided on board the vehicle and is adapted to be displaced along an axis forming with the axis of displacement of the mass M1 a predetermined angle, for example, an angle of 90°. Three instruments similar to the instruments A, B, C may also give the accelerations, speeds and distances traversed relative to the vehicle in accordance with said second direction.

It is clear that the vectorial composition of the results obtained with the two sets of instruments will give the real accelerations, speeds and distances traversed by the vehicle in a direction relative to an axis of the vehicle.

The coefficients introduced by the instruments A, B, C or the two series of measurements may either be calculated or determined by trial. Similarly, the results may be either manually recorded, or automatically registered.

In the case where the mass M1 is so disposed as to be displaced only in the actual direction of movement of the vehicle, the distances obtained will correspond to the distances actually traversed by the vehicle; if the mass M2 is at the same time constrained to be displaced only perpendicularly to said direction of travel, the distances obtained will indicate the lateral deviations of the vehicle from the normal direction of travel assigned thereto.

It is clear that the instruments employed must be such that if the vehicle stops and then starts off again in the opposite direction on its path without turning, said instruments will function in the opposite direction and will indicate an acceleration, a speed and a distance in the reverse direction which will be deducted automatically from the direct acceleration, speed and distance, restoring the instruments A, B, C to zero when the vehicle has returned to its point of departure.

In order to fix the axes or directions along which the masses M1 and M2 may be displaced, it is possible to use either an apparatus especially provided for the purpose, or an apparatus normally existing on board the vehicle, such as a gyroscope, gyro-compass, magnetic compass or course repeater, i. e. an instrument having the property of maintaining fixed in space a determined known direction despite the rotations or displacements of the vehicle on which it is mounted. It will then be sufficient to make the axes of displacement of the masses M1 and M2 coincident with the fixed axis of said "directive" apparatus.

If the directive apparatus is a course repeater and the mass M1 is displaceable only on a north-south axis, the corresponding instrument will indicate the component of the distance traversed by the vehicle on the north-south line. Similarly, if M2 may be displaced only on an east-west axis, the corresponding instrument will indicate the component of the distance traversed on the east-west line. The vehicle may then perform any evolutions; its point of departure being known, the composition of the indications on the north-south and east-west axes will give the geographical point where the vehicle is located at a given moment.

By recording on a map the successive values of the indications given, the line of the course followed by the vehicle will be obtained. Furthermore, by comparing this recorded route with a route previously traced on the map, indications as to the corrections to be made in the navigation are at once given to the pilot. It is clear that the course recorded may be automatically obtained on the map with the aid of the integrating instruments giving the distances. In accordance with another aspect, the invention contemplates automatic piloting of the vehicle by the provision of suitable means, known or specific, for handling the controls in accordance with a comparison of the two courses. For example, the course to be followed may be so traced as to be luminous and a pointer may be provided to be displaced in accordance with the indications recorded of the course actually followed. A photo-electric cell, for example, or other photo-sensitive device would be excited by the deviations of said pointer from the luminous course and would operate a course correcting control circuit.

If, on the other hand, the masses M1 and M2, their axes and the directive instrument are disposed in an apparatus which ensures a constant position of the whole arrangement relatively to the vertical, a vehicle, such as an aircraft or submarine, may be displaced by rising or descending relatively to its point of departure without falsifying the indications, which then depend solely on the horizontal components of the accelerations, which alone create displacements visible on a map in a horizontal plane.

While, as discussed above, an arrangement specifically including only two axes is illustrated, it is clear that the same principles apply regardless of the number of axes used. Thus any number of $n$ axes may be used and the $n$ components may be combined to give a desired indication in the small $n$ coordinates corresponding to the $n$ axes.

The components of acceleration along the axes, twice integrated, give the components of the distances along these same axes and the resultant gives the actual distance traversed in space.

A large number of means may be employed to indicate the displacements of the masses supported by elastic plates or springs of varied nature, from the slightest displacement to the largest. Although the invention is described hereinafter in the case of a specific embodiment, the following means may, in particular, be employed; that is to say, the displacements of the masses may be utilised to produce, in particular, the following effects:

The masses may be disposed in such a manner as to produce variations of electric capacity between fixed plates and movable plates connected to the masses. Said variations of capacity may, for example, act on the frequency of an oscillator.

The masses may be disposed to give rise to variations of inductance or coupling between fixed inductances and inductances variable in accordance with the displacements of the masses.

It is also possible to conceive systems in which the displacements of the masses would give rise to variations of magnetic flux or of magnetic permeability. The displacements of the masses could cause displacements of lines of magnetic force which would create variations of current in a device such as a magnetron.

Variations of current intensity in an electrolyte through variation of resistance between two plates, one of which would, for example, be integral with a mass, variations of the electronic flow in a discharge tube one electrode of which is mechanically or electrically influenced by the displacement of a mass may also be employed.

Other modes of action of the masses may be contemplated; their displacements could control variations in delivery of a liquid or a gas, variations in the frequecny of oscillation or a pendulum or of an oscillating chronometer flywheel. The masses may act on gyroscopes and produce therein suitable integrant precessions.

Photo-electric means may likewise be utilised; a luminous flux can be modified by the displacement of a mass, by mirror or shutter, and act on the excitation of a member such as a photo-electric cell.

Chemical means may be employed; for example, the quantity of electricity representing, with the approximation of one coefficient, the speed in one direction and may be measured or indicated by the deposition of a substance from an electrolyte traversed by a current regulated by the displacement of the mass or by the electric charge of a chemical electricity accumulation system.

Another means of integration of a current is given by the evaluation of the number of calories dissipated by said current in a resistance placed in a strictly heat-insulated zone.

Finally, mechanical means of integration, such as integraphs and roller planimeters, may obviously be employed.

In all of these devices, it is clear that, with a view to avoiding variations of any nature due to differences in temperatures, all or part of said devices may be heat-insulated or maintained at a constant temperature by means of a thermostat and by the use of metals such as invar, elinvar, constantan, and the like.

Other means than those that have just been mentioned may obviously be utilised in embodiments of the invention, without thereby departing from the scope thereof.

In certain cases it is advantageous to permit the displacement of the masses only within the limits necessary for releasing a regulator system which restores and always tends to restore the mass to its starting position, the integration of the force tending to restore or maintain the mass in its original position being a measure of the speed with the approximation of one coefficient.

For example, the following arrangement may be employed for this purpose:

The mass being in equilibrium and mechanically connected to a magnetic member displaceable between two electromagnets, a displacement of the mass gives rise, through a contact or other means, to the passage of the current in that one of the electromagnets that is to restore said mass to its position of equilibrium. The mass vibrates normally at a certain speed, but the algebraic sum of the currents passing in the two electric-magnets is nil. If the mass is solicited in one direction or the other, a polarised current arises and its intensity depends on the energy supplied to maintain said mass in its position of equilibrium. The integration of said current by an electricity counter of any suitable type will give the speed with the approximation of one coefficient.

Such systems, or reaction systems, may be constituted not only by electromagnetic means as described above, but also by electrostatic means (capacitive attraction), electro-mechanical means (elecrtic motors) or electro-dynamic means (coupled inductances), and so on. They may find direct applications, for example, in the automatic piloting of vehicles, the course of which must be rectilinear or predetermined. In order to restore the mass to its initial position it is clear that a separate source of auxiliary energy must be provided in the system.

Referring now more particularly to the drawings:

Fig. 1 represents resilient support of the mass in a gyroscope repeater, in the specific case where tuning forks are employed as means for measuring the displacements of the mass; while Fig. 2 represents a specific embodiment, in the case of indication and integration by means of tuning forks;

Fig. 3 represents, by way of example, a specific device for automatically recording on a map a course followed by a vehicle; and Fig. 4 is a plan view of a portion of Fig. 3.

Referring to Fig. 1, a plate 1 of a gyroscope repeater for example, or of any apparatus mounted vertically on board, is particularly formed to carry, so as to move in two perpendicular planes masses 2 and 3, the mass 2 being imagined as able to be displaced in accordance with the north-south direction and the mass 3 in accordance with the east-west direction. Said masses 2 and 3 are supported, respectively, by flat flexible strips or flat springs 4 and 5 fixed in any suitable manner on the plate 1, for example by means of the right-angled member 6 and screw 7. The plate is, naturally, suitably balanced. Near the mass 2, or 3, is fixed on the strip 4, or 5, a block of a magnetic substance 8, or 9, maintained orthogonally to the plane of the strip on a rod 10, or 11, fixed on the strip by a right-angled member 12 and screws 13, for example, or in any other manner. The means for compensating the action of said blocks on the strips 4 and 5 when the vehicle is at rest are not represented, for the sake of simplicity in the drawing. The magnetic blocks 8 and 9 penetrate between the limbs of tuning forks 14 and 15 which are represented in section in Fig. 1 and in plan-views in Fig. 2. Said tuning forks are excited normally by means of coils 16 and 17, respectively.

Fig. 2, in which like symbols denote like members as in Fig. 1, represents schematically the electric indicator and integrator circuits utilising tuning forks.

The two tuning forks 14 and 15 are maintained oscillating by the same source as a free tuning fork 18 excited by a coil 19. This source feeds, through a suitable inlet filter 20, devices sensitive to the frequency variations, 21, 22, 23 and 24 and 25, associated with tuning forks 14, 15, 18 and 26 and 27 respectively. Said devices are influenced by the tuning forks and modify the frequency of the entering feeding current. The device 23, is furthermore, different from the others and may simply consist of a frequency regulator, since the tuning fork 18 remains unaffected. The output currents of said devices feed synchronous motors 28, 29, 30, and 31, 32, 33. The two motors 29 and 32 are fed with constant frequency under the influence of the sustained tuning fork 18 and the regulator 23. At the ends of the shaft 70 of the motor 29 are fixed the stators of synchronous motors 28, 30, identical to the first. The motors 28, 30 are energized to turn in the opposite direction to motor 29 so far as the movement of the rotor with respect to the stator of these motors is concerned. These two motors 28 and 30 are subjected respectively to the influence of the tuning forks 14 and 15, the frequency of which is modified by the action of the masses 2 and 3 and which, in consequence, carry round the corresponding synchronous motors at a different speed from that of the motor 29. Similarly, the motors 31 and 33 turn in the opposite direction to that of the constant frequency motor 32 and their stators are fixed by screws or key 35 or other suitable means on the end of the shaft 36 of the motor 32. The various motors may be fed by means of rings 37 and slide contacts 38 fixed on the bearings 39 of the support frame. The motors 29 and 32 are fed by pick-up means 41 carried directly by the support frame.

The motors 31 and 33 have their frequency modified by the tuning forks 26 and 27 maintained oscillating by the coils 42 and 43 respectively. Said tuning forks have their own frequency of vibration modified by the means indicated in the drawing or by any other suitable means, in dependence upon the angular displacement of the shafts 44 and 45 of the motors 28 and 30 respectively. This may be effected, for example, by means of pinions or other gear members 46, 47 engaging with toothed wheels 48, 49 controlling the tension of helical springs 50, 51 diverging from or approaching the U-shaped limbs of the forks 26 and 27 in any known manner, for example, by a rotating cam. In consequence, the pressure on the tuning fork tines is varied modifying their frequency and therefore the frequency of the current of the synchronous motors 31 and 33. The axes 52 of the motor 31 and 53 of the motor 33 will, in consequence, assume angular displacements, relatively to their initial positions, giving the desired indications, i. e. the distances traversed in the two directions north-south and east-west.

The operation of such a device may be explained as follows:

When the mass 2, for example, is subjected to any acceleration, the spring support 4 permits a displacement in the north-south direction or vice-versa. The magnetic block 8 disturbs the frequency of vibration of the fork 14, which reacts on the sensitive device 21 which, in turn, proceeds to modify the frequency and thus the speed of rotation of the motor 28. The stator of the motor 28 turns in one direction at a speed depending on the frequency of the fork 18 which is normally identical with the fork 14, in consequence of its coupling to the shaft 70 and its rotor, fed by current of the same frequency, has remained motionless up to this point. When the feed frequency of the rotor varies, the latter will assume a rotation and, in consequence, a certain angular displacement relatively to its original position. This angular displacement is proportional to the integral of the acceleration and hence, to the speed. Said angular displacement could be directly indicated at the end of the shaft 44. But as, in order to fulfill the aim of the invention, an integration of said indication, which gives the speed of the vehicle in the north-south direction, is necessary in order to obtain the distance traversed, the shaft 44 carries a gear wheel 46, which, through the intermediary of a wheel 48 and a spring 50, proceeds to modify the frequency of vibration of another fork 26 controlling the frequency, and therefore the speed of rotation, of the synchronous motor 31. Said motor 31 is mounted, relatively to the motor 32 with frequency (and speed of rotation), in the same manner as the motor 28 relatively to the motor 29. Its shaft 52 will therefore assume an angular displacement relatively to the normal at rest position, which displacement will give the desired indication, namely the distance traversed in the north-south direction.

The functioning of the device, as regards the mass 3, is similar and the angular displacement of the shaft 53 gives the distance traversed in the east-west direction.

The composition of these two indicators will obviously give the distance traversed by the vehicle. Said composition may either be made manually or recorded automatically. Fig. 3 represents, by way of example, an apparatus that it is possible to utilise for automatically recording on a map the course followed by a vehicle.

In said figure, the constant speed motor 32, and motors 31 and 33 with speed variable in accordance with the displacements of the masses 2 and 3, are represented in order to indicate the relation between this device and that shown in Fig. 2. At the end of the shaft 52 is fixed a pinion or other gear member 54 which engages with a toothed wheel 55 of suitable dimensions. At the end of the shaft 53 is disposed another gear member 56 cooperating with a toothed wheel of suitable dimensions 57. The toothed wheel 55 controls the unwinding of the map through the medium of the rod 59 which is in one piece therewith and carries an endless screw 60 engaging with a pinion 61 forming part of the device carrying the map (not shown). The toothed wheel 57 engages with a rack 62 ending in a pointer 63 or any suitable registering device, depending on whether the course has been traced in advance on the map or is to be traced as the vehicle moves on. A magnifying lens may be incorporated, as shown, on the pointer 63. The map may, for example, pass over two free rollers 64, 65, as represented in Fig. 4.

It is clear that this device for automatically recording the course on the map may be utilised whatever the direction followed by the vehicle, one axis unwinding the map in the direction of the course of the vehicle and the other axis giving the various deviations of the vehicle from the direction of the course.

It is likewise clear that means, for example photo-electric means, may be provided for automatically controlling the controls of a vehicle as soon as the indicator diverges from the course traced out in advance, for example, for a flight over a straight course.

The devices represented in the drawings have been given solely by way of example and in order to permit an explanation enabling the invention to be understood. But other integrator and indicator devices employing other means may be provided to give either the course on board vehicles, or any other desired indication for other uses, for example altimetry (altitude or depth), automatic piloting, indication of speed or acceleration, and so on, without departing from the scope of the invention.

What is claimed is:

1. A navigation instrument comprising, a constant frequency electrical supply source, an oscillator normally operating at the frequency of said source, a synchronous motor connected to said source for operation at a constant speed, a second synchronous motor, means for rotating the stator of said second motor at the speed of said first motor, means for supplying energy from said oscillator to the stator of said second motor in such manner as to tend to rotate the rotor of said second motor in a direction opposite to the rotation of its stator, means for measuring the acceleration of a moving vehicle in the direction of a reference axis fixed in space, and means for varying the frequency of said oscillator in response to said measured acceleration, whereby actual rotation of said rotor will occur proportional to the speed of said vehicle.

2. A navigation instrument in accordance with claim 1, said last named means comprising two masses constrained to move in two respective directions at right angles to indicate acceleration along their axes, and means for translating the movement of each mass to a change in frequency of an oscillating device, and said means for measuring said acceleration comprising means for comparing said changes with said reference frequency in respective synchronous motors, a movable recording sheet, means for moving said sheet in accordance with resultant movement of the rotor of one of said motors in a direction corresponding to the directions of deviation, a pointer movable over said recording sheet, and means responsive to movement of the rotor of the other motor to move said pointer to and fro across the said recording sheet, to give an indication of the resultant speed and direction of movement of the vehicle.

3. A navigation instrument comprising two masses constrained to move in two directions at right angles, a source of standard frequency, two oscillating devices, means operatively associating said masses and said oscillating devices for translating the movement of each mass to a changing frequency of a corresponding one of said oscillating devices, a pair of synchronous motors corresponding to said oscillators controlled jointly by said source of standard frequency and the output of the corresponding oscillating device, whereby said changes are each compared with said standard frequency in its respective synchronous motor to produce a movement of the rotors of said motors, two second oscillating devices, means responsive to movement of each rotor to a change of frequency in a corresponding one of said second oscillating devices, a second pair of synchronous motors, a source of a second standard frequency, means for comparing changes of frequency in said second oscillating devices with said second standard frequency in said second respective synchronous motors, a recording sheet, means for moving said recording sheet in accordance with the rotor of one of said second synchronous motors in a direction corresponding to the direction of movement of the vehicle along the corresponding reference axis, a pointer movable over said recording sheet, and means responsive to movement of the rotor of the other second synchronous motor to move said pointer to and fro across the said sheet, to give an indication of the distance from the point of departure and the direction of movement of the vehicle in space.

4. A navigation instrument in accordance with claim 3, wherein the said first oscillating devices each comprise an electrically driven tuning fork, the frequency of which is varied by varying the position of a block of magnetic material in response to the movement of the respective associated mass upon a change in speed of the vehicle in the direction of the reference axis along which the said mass is constrained to move.

5. Navigation instruments in accordance with claim 3 in which one of said masses is constrained to move in a vertical direction to give a measure of the vertical height or altitude of the vehicle, the vertical acceleration and instantaneous vertical speed, and the other of said masses is constrained to move along a horizontal direction, the vertical path in the vertical plane containing said horizontal direction.

EDWARD HILL ULLRICH.
HENRI GASTON BUSIGNIES.